United States Patent Office 2,996,512
Patented Aug. 15, 1961

2,996,512
THERAPEUTIC DERIVATIVES OF ARYL-BENZTHIAZOLES
Francis Frederick Stephens, Northolt Park, England, assignor to The Crookes Laboratories Limited, London, England, a British company
No Drawing. Filed Nov. 1, 1957, Ser. No. 694,055
8 Claims. (Cl. 260—304)

This invention relates to new therapeutic derivatives of arylbenzthiazoles and more particularly to the preparation of basic ethers of 2-arylbenzthiazoles and salts and quaternary ammonium compounds derived from these bases.

These new therapeutic compounds have valuable medicinal properties for example anti fungal and anti-bacterial action.

In accordance with the present invention there are provided therapeutic derivatives of arylbenzthiazoles the bases of which may be represented by the general formula:

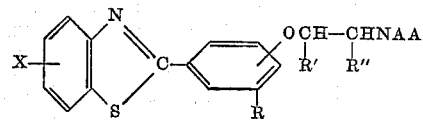

wherein X represents hydrogen or halogen atom(s), or amino, dialkyl amino or alkoxy group(s), R represents hydrogen or halogen atom(s) or alkoxy group(s), R' and R" represent hydrogen atom(s) or alkyl group(s), AA represents alkyl or aryl group(s) which may be the same or different or AA may be part of a ring such that NAA represents for example a piperidino or morpholino residue and wherein the basic ether group =OCHR'.CHR".NAA may be substituted in the ortho, meta or para position of the 2-phenyl ring or the groups X and —OCHR'.CHR".NAA may be interchanged.

The invention also includes therapeutic derivatives of arylbenzthiazoles comprising salts and quaternary ammonium compounds derived from the bases as set out above and which may be represented by the general formula:

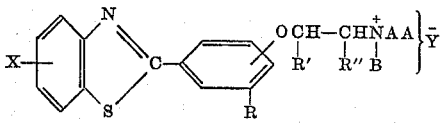

wherein X, R, R', R" and A have the meanings defined in claim 1, B represents hydrogen atom(s) or alkyl groups(s) or a polymethylene chain (such that two molecules of the basic ethers are joined through B to form a bis-quaternary salt of the type (Z—B—Z) where Z represents the basic ethers themselves) and Y is an anion derived from an inorganic or organic acid (such as hydrochloric, hydroiodic, hydrobromic, acetic, tartaric, citric, oxalic, undecylenic or sulphuric) or an anion (such as chloride, bromide, iodide, or p-toluenesulphonate). When B is hydrogen and Y is an anion derived from an inorganic or organic acid as set out above, the formula represents salts of the basic ethers. When B is an alkyl group and Y is an anion as set out above, the formula then represents the quaternary ammonium compounds derived from these basic ethers.

According to a further feature of the invention these basic ethers may be prepared by condensation of an o-aminothiophenol or its hydrochloride with basic-ethers of hydroxy benzaldehydes; such condensation may be effected in a mixture of acetic acid and ammonium acetate under refluxing conditions and the product is normally the basic ethers themselves. Alternatively, according to the invention, salts of these basic ethers may be prepared by heating the hydrohalides of appropriately substituted o-aminothiophenols with an equimolecular quantity of a basic ether of hydroxy benzaldehyde in nitrobenzene solution; in this process the o-aminothiophenol hydrohalide and the aldehyde are dissolved in nitrobenzene and the solution is either heated to 180° (internal temperature) for example for 15 to 60 minutes or may be refluxed for 30 minutes when, on cooling, the hydrohalides of the basically substituted 2-phenyl benzthiazoles separate in high yield. Alternatively, the o-aminothiophenols may be replaced by appropriately substituted o-aminophenyl-thiosulphuric acids and the condensation is effected with the dialkylamino alkoxybenzaldehyde in acetic acid-ammonium acetate. Alternatively, according to the invention, suitable 2-phenyl benzthiazole alkyl ethers may be dealkylated with for example aluminum chloride and the resulting hydroxy phenyl benzthiazoles condensed with dialkyl amino alkyl chlorides to give the basic ethers of 2-phenyl benzthiazole. Such bases may be converted to salts by well known methods.

The quaternary ammonium compounds in which B represents an alkyl group may be prepared according to the invention by condensation of o-aminothiophenols or their hydrochlorides with quaternary ammonium aldehydes of the type:

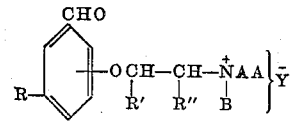

Such condensations being effected in refluxing alcoholic solution. Alternatively, such quaternary benzthiazole ethers may be prepared by alkylation of the tertiary basic ethers themselves. The bis-quaternary ammonium compounds in which B represents a polymethylene chain may be prepared according to the invention by fusion of two molecular equivalents of the tertiary basic ethers with one molecular equivalent of an α:ω-dihalogeno-alkane.

EXAMPLES

*Example 1.*—75 grams of o-aminothiophenol hydrochloride, 75 g. p-dimethylaminoethoxy benzaldehyde, 200 ml. glacial acetic acid and 100 g. ammonium acetate were boiled together under reflux for 2 hours. After cooling, the mixture was poured into water and the solution made alkaline with 40% caustic soda solution to precipitate a brown oil which solidified on cooling. The solid was removed and crystallised from light petroleum (B.P. 60–80°) to give 2-(p-dimethylaminoethoxyphenyl) benzthiazole as pale yellow plates, M.P. 74–75°.

*Example 2.*—20 g. of 4-chloro-2-aminothiophenol hydrochloride, 22 g. p-diethylaminoethoxy benzaldehyde, 200 ml. glacial acetic acid and 100 g. ammonium acetate were boiled together under reflux for 3 hours then treated as described in Example 1 to give, after crystallization from light petroleum followed by crystallisation from ethanol, white plates of 5-chloro-2-(p-diethylaminoethoxyphenyl) benzthiazole, M.P. 93–94°. 47 g. of this base were dissolved in 230 ml. of a mixture of equal volumes of acetone and 96% ethanol and the resulting solution treated at the boil with a solution of 20 g. of tartaric acid dissolved in 230 ml. of the same solvent mixture also at the boil. After cooling to 0°, the white 5-chloro-2-(p-diethylaminoethoxyphenyl) benzthiazole tartrate, M.P. 131–132°, was removed and air dried. Treatment of the base with an equimolecular quantity of citric acid by the same procedure gave 5-chloro-2-p-(diethylaminoethoxyphenyl) benzthiazole citrate which recrystallised from water and melted at 167°. 5-chloro-2-(p-diethylaminoethoxyphenyl) benzthiazole oxalate, M.P. 171–172°, was similarly prepared.

*Example 3.*—16 g. of o-diethylaminoethoxy benzaldehyde, 14.5 g. 4-chloro-2-aminothiophenol hydrochloride and 75 ml. nitrobenzene were heated together at 180° (internal temperature) for 1 hour then allowed to cool. The crystalline solid was removed by filtration, washed with ether then recrystallised from ethanol to give 5-chloro-2-(o-diethylaminoethoxyphenyl) benzthiazole hydrochloride, M.P. 222–223°. A solution of this hydrochloride in water was made alkaline with ammonia to precipitate 5-chloro-2-(o-diethylaminoethoxyphenyl) benzthiazole which crystallised from alcohol in white plates, M.P. 51–52°.

*Example 4.*—22 g. of m-diethylaminoethoxybenzaldehyde, 20 g. 4-chloro-2-aminothiophenol hydrochloride and 100 ml. nitrobenzene were heated together at 180° for 1 hour then allowed to cool. The solid was removed by filtration, washed with ether then recrystallised from methanol to give 5-chloro-2-(m-diethylaminoethoxyphenyl) benzthiazole hydrochloride as a white solid M.P. 184–185°.

*Example 5.*—21 g. of 5-ethoxy-2-aminothiophenol hydrochloride, 22 g. p-diethylaminoethoxy benzaldehyde and 100 ml. nitrobenzene were heated together at 180° for 1 hour then allowed to cool. The crystalline solid, M.P. 187–188°, was removed, washed with ether then recrystallised from ethanol to give 6-ethoxy-2-(p-diethylaminoethoxyphenyl) benzthiazole hydrochloride, M.P. 192–193°. The free base crystallised from alcohol and had M.P. 84–85°.

*Example 6.*—105.6 g. of p-diethylaminoethoxy benzaldehyde, 96 g. 4-chloro-2-aminothiophenol hydrochloride and 480 ml. nitrobenzene were heated together to 180° for 15 minutes then allowed to cool and worked up as in the preceding example to give 5-chloro-2-(p-diethylaminoethoxyphenyl) benzthiazole hydrochloride as white needles from water, M.P. 224–225°.

*Example 7.*—20 g. of o-aminothiophenol hydrochloride, 27.5 g. p-diethylaminoethoxy benzaldehyde and 100 ml. nitrobenzene were boiled together under reflux for 30 minutes then allowed to cool. The solid was removed by filtration, washed with ether and dried to give a pale yellow solid M.P. 208–210°. A solution of this hydrochloride in water was lightly charcoaled then made alkaline with ammonia to precipitate 2-(p-diethylaminoethoxyphenyl) benzthiazole as a light brown oil, B.P. 200°/0.25 mm. M.P. 37–39°. The tartrate, prepared as described in Example 2, was a white solid M.P. 134–135°.

*Example 8.*—2 g. of o-aminothiophenol hydrochloride, 2.6 g. p-dimethylaminoisopropoxy benzaldehyde and 10 ml. nitrobenzene were refluxed together for 30 minutes, cooled, diluted with ether and the solid removed by filtration. The solid was dissolved in water, the solution lightly charcoaled then made alkaline with ammonia to precipitate a light brown oil which was distilled to give 2-(p-dimethylaminoisopropoxyphenyl) benzthiazole, B.P. 219–221°/0.4 mm. The hydrochloride, M.P. 202–203°, crystallised from ethanol.

*Example 9.*—4.9 g. of 4-chloro-2-aminothiophenol hydrochloride, 5.9 g. p-4-morpholinoethoxy benzaldehyde, 50 ml. acetic acid and 25 g. ammonium acetate were boiled under reflux for 3 hours, then treated as described in Example 1 to give 5-chloro-2-(p-4-morpholinoethoxyphenyl) benzthiazole as a white solid M.P. 133–134°. The base was converted into its tartrate, M.P. 155–157° and into its hydrochloride, M.P. 252–254°.

*Example 10.*—1 g. of 3-bromo-4-p-diethylaminoethoxybenzaldehyde, 0.65 g. of 4-chloro-2-aminothiophenyl hydrochloride and 5 ml. nitrobenzene were heated together at 180° for 1 hour, cooled and the solid removed by filtration. After washing with ether, the solid was crystallised from ethanol to give 5-chloro-2-(m-bromo-p-diethylaminoethoxyphenyl) benzthiazole hydrochloride, M.P. 221–222°.

*Example 11.*—2.21 g. of p-diethylaminoethoxy benzaldehyde, 2.48 g. 5-dimethylamino-2-amino phenylthiosulphuric acid, 25 ml. acetic acid and 12.5 g. ammonium acetate were refluxed together for 3 hours. After cooling, the mixture was poured into 100 ml. water, neutralised with sodium hydroxide and the liberated oil taken into ether. Evaporation of the ether gave 6-dimethylamino-2-(p-diethylaminoethoxyphenyl) benzthiazole as a gum which was purified by the preparation of its tartrate, M.P. 94–96°, as described in Example 2.

*Example 12.*—32.5 g. of o-aminothiophenol hydrochloride and 76 g. p-triethylaminoethoxy benzaldehyde iodide were dissolved in 1.5 litres ethanol and the solution boiled under reflux for 2 hours. The solvent was then removed by evaporation and the residue crystallised from water to give 2-(p-triethylaminoethoxyphenyl) benzthiazole iodide, M.P. 208–210°.

*Example 13.*—10 g. of a p-trimethylaminoisopropoxy benzaldehyde iodide and 3.6 g. freshly distiled o-aminothiophenol were dissolved in 100 ml. ethanol and the solution refluxed for 2 hours then allowed to cool. The pale yellow solid which separated was removed and crystallised from water to give 2-(p-trimethylaminoisopropoxyphenyl) benzthiazole iodide as a white solid, M.P. 226–227°.

*Example 14.*—1.25 g. o-aminothiophenol, 3.65 g. m-methoxy - p - trimethylaminoethosy benzaldehyde iodide and 20 ml. ethanol were reuuxed for 2 hours then allowed to cool to give a yellow crystalline solid. Recrystallisation of the solid from water gave 2-(m-methoxy-p-trimethylaminoethoxyphenyl) benzthiazole iodide M.P. 210–211°.

*Example 15.*—3 g. of 2-amino-5-chloro-thiophenol, 3.8 g. p-diethylaminoethoxy benzaldehyde, 30 ml. acetic acid and 15 g. ammonium acetate were refluxed for 3 hours then treated as described in Example 1 to give 6-chloro - 2 - (p-diethylaminoethoxyphenyl) benzthiazole, M.P. 116–117°. The tartrate had M.P. 170–171° and was prepared by the general method given in Example 2.

*Example 16.*—6-methoxy-2-(p-chlorophenyl) benzthiazole was demethylated by reaction with aluminum chloride in chlorobenzene and the resulting 6-hydroxy-2-(p-chlorophenyl) benzthiazole, M.P. 256–258° (12.5 g.) was alkylated by reaction with 8.2 g. 2-diethylaminoethylchloride hydrochloride in 120 ml. ethanol containing 2.2 g. sodium by refluxing for 5 hours. After removal of sodium chloride by filtration, the filtrate was evaporated to dryness under reduced pressure and the residue shaken with ether and normal sodium hydroxide solution. Evaporation of the ether solution gave crude 6-diethylaminoethoxy - 2 - (p-chlorophenyl) benzthiazole which crystallised from 40–60° petrol as white plates, M.P. 72–74°. The tartrate had M.P. 77–78°.

*Example 17.*—40 g. of 5-chloro-2-(p-dimethylaminoethoxyphenyl) benzthiazole and 18.2 g. 1:10-dibromo-n-decane were well mixed then heated together in an oil bath at 150° for 30 minutes. After cooling, the product was ground to a powder, washed with ether then crystallised from water to give 1:10-bis(5-chloro-2-p-dimethylammoniumethoxyphenylbenzthiazole - n - decane dibromide, as a pale yellow solid M.P. 225–226°.

*Example 18.*—16 g. 5-chloro-2-(p-diethylaminoethoxyphenol) benzthiazole and 8.2 g. undecylenic acid were heated together under nitrogen in an oil bath at 120–140° for 30 minutes then allowed to cool giving crystalline 5-chloro-2-(p-diethylaminoethoxyphenyl) benzthiazole undecylenate as an off white solid. M.P. 55–60°.

*Example 19.*—10 g. 5-chloro-2-(p-diethylaminoethoxyphenyl) benzthiazole, 15 ml. ethyl iodide and 45 ml. dimethylformamide were boiled together under reflux for 1 hour, cooled and the crystalline solid removed by filtration. Recrystallisation of the product from water gave 5-chloro - 2 - (p-triethylaminoethoxyphenyl) benzthiazole iodide M.P. 233° identical with material prepared by the route described in Example 12 and mentioned in the following table.

The following compounds have been prepared in addition to those described in the above examples and as variants thereof.

| Compound | M.P., degrees | Solvent for recryst. | Method of Prep. |
|---|---|---|---|
| 2-(p-Trimethylaminoethoxyphenyl) benzthiazole iodide. | 261–262 | Water | As in examples 12, 13 or 14. |
| 5-chloro-2-(p-trimethylaminoethoxy-phenyl) benzthiazole iodide. | 252–254 | do | |
| 5-chloro-2-(p-triethylaminoethoxy-phenyl) benzthiazole iodide. | 233 | do | |
| 5-chloro-2-(p-trimethylaminoisopropoxyphenyl) benzthiazole iodide. | 234–235 | do | |
| 6-chloro-2-(p-triethylaminoethoxy-phenyl) benzthiazole iodide. | 233–234 | do | |
| 5-chloro-2-(p-diethylaminoethoxy-phenyl) benzthiozole methiodide. | 231–232 | do | |
| 5-chloro-2-(p-dimethylaminoethoxy-phenyl) benzthiozole. | 121 | Petrol | As in examples 2 or 3. |
| 5-chloro-2-(p-dimethylaminoethoxy-phenyl) hydrochloride. | 247–248 | Water | |
| 5-chloro-2-(p-dimethylaminoethoxy-phenyl) tartrate. | 174–175 | do | |
| 5-chloro-2-(p-dimethylaminoisopropoxyphenyl) benzthiazole. | 115–116 | Ethanol | |
| 5-chloro-2-(p-dimethylaminoisopropophenyl) hydrochloride. | 204–205 | Isopropanol. | |
| 5-chloro-2-(p-dimethylaminoisopropophenyl) tartrate. | 143–145 | Aqueous acetone. | |
| 5-chloro-2(p-di-n-butylaminoethoxy-phenyl) benzthiazole. | 63–64 | Petrol | |
| 5-chloro-2(p-di-n-butylaminoethoxy-phenyl) tartrate. | 76–78 | Water | |
| 6-Amino-2-p-diethylaminoethoxy-phenyl benzthiazole tartrate. | 175–176 | Aq. acetone. | As in example 11. |

What we claim is:

1. A compound selected from the group consisting of benzothiazole derivatives having the formula

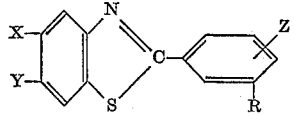

in which one of X and Y is hydrogen, another one of X, Y and Z is selected from the group consisting of hydrogen, bromine, chlorine, amino, di(lower alkyl) amino and lower alkoxy, and yet another one of Y and Z is a

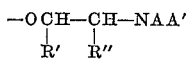

group, R is selected from the group consisting of hydrogen, bromine and lower alkoxy when Z is

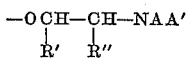

and R is hydrogen when Z is selected from the group consisting of hydrogen, chlorine, bromine, amino, di(lower alkyl) amino, and alkoxy, one of R' and R'' is hydrogen and the other of R' and R'' is selected from the group consisting of hydrogen and methyl, and NAA' is selected from the group consisting of di(lower alkyl) amino groups and 4-morpholino; the non-toxic acid-addition salts, and the quaternary ammonium salts of said benzothiazole derivatives in which the NAA' group is associated with a lower alkyl halide, and bis(quaternary ammonium) salts in which the NAA' groups of two molecules of the foregoing formula are associated with an α,ω-dihaloalkane.

2. 6-diethylaminoethoxy-2-(p-chlorophenyl) benzthiazole.

3. 5-chloro-2-(p-diethylaminoethoxyphenyl) benzthiazole.

4. 6-chloro-2-(p-diethylaminoethoxyphenyl) benzthiazole.

5. A process for preparing a compound selected from those having the formula

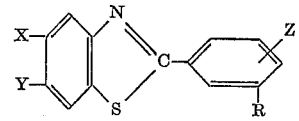

which comprises condensing a compound selected from those having the formula

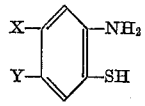

with a compound having the formula

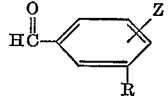

in which formulae one of X and Y is hydrogen, another one of X, Y and Z is selected from the group consisting of hydrogen, bromine, chlorine, amino, di(lower alkyl) amino and lower alkoxy, and yet another one of Y and Z is a

group, R is selected from the group consisting of hydrogen, bromine and lower alkoxy when Z is

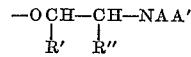

and R is hydrogen when Z is selected from the group consisting of hydrogen, chlorine, bromine, amino, di(lower alkyl) amino, and alkoxy, one of R' and R'' is hydrogen and the other of R' and R'' is selected from the group consisting of hydrogen and methyl, and NAA' is selected from the group consisting of di(lower alkyl) amino groups and 4-morpholino.

6. A process as claimed in claim 5, carried out in solution in a mixture of acetic acid and ammonium acetate under refluxing conditions.

7. A process as claimed in claim 5 carried out in solution in nitrobenzene at an internal temperature of 180° C.

8. A process as claimed in claim 5 carried out in solution in ethanol under refluxing conditions.

References Cited in the file of this patent

FOREIGN PATENTS 541,567    Germany    Jan. 13, 1932